US009668031B2

(12) United States Patent
Landow et al.

(10) Patent No.: US 9,668,031 B2
(45) Date of Patent: *May 30, 2017

(54) APPARATUS, SYSTEMS AND METHODS FOR ACCESSING AND SYNCHRONIZING PRESENTATION OF MEDIA CONTENT AND SUPPLEMENTAL MEDIA RICH CONTENT

(71) Applicant: EchoStar Technologies L.L.C., Englewood, CO (US)

(72) Inventors: Kate Landow, Denver, CO (US); John Card, Denver, CO (US); Daniel Overbaugh, Aurora, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 98 days.

This patent is subject to a terminal disclaimer.

(21) Appl. No.: 14/678,594

(22) Filed: Apr. 3, 2015

(65) Prior Publication Data
US 2015/0271572 A1 Sep. 24, 2015

Related U.S. Application Data

(63) Continuation of application No. 12/968,002, filed on Dec. 14, 2010, now Pat. No. 9,009,339.
(Continued)

(51) Int. Cl.
G06F 15/16 (2006.01)
G06F 15/173 (2006.01)
(Continued)

(52) U.S. Cl.
CPC ....... *H04N 21/8133* (2013.01); *H04N 21/222* (2013.01); *H04N 21/2353* (2013.01);
(Continued)

(58) Field of Classification Search
CPC ............. H04L 12/1822; H04L 12/1831; H04L 12/2556; H04L 12/285858; H04L 41/28;
(Continued)

(56) References Cited

U.S. PATENT DOCUMENTS 7,536,706 B1    5/2009  Sezan et al.
2003/0145338 A1* 7/2003  Harrington ............ H04N 7/088
                                                                725/136
(Continued)

FOREIGN PATENT DOCUMENTS

EP              982947 A2    3/2000

OTHER PUBLICATIONS

Jim Wilkinson et al., The Material Exchange Format (MXF) and its Application; Presented at the 143rd SMPTE Technical Conference and Exhibition (paper No. 17) in New York City, Nov. 4-7, 2001. The content was updated on Jun. 21, 2002; SMPTE Journal, Sep. 2002; www.smpte.org; 7 pages.
(Continued)

*Primary Examiner* — Farzana Huq
(74) *Attorney, Agent, or Firm* — Lowe Graham Jones PLLC

(57) ABSTRACT

Media rich content server systems and methods are operable to provide access to supplemental media rich content at a portable media device. An exemplary embodiment communicatively couples a portable media device to a media device that initially receives a media content stream comprising at least one supplemental media rich content trigger, wherein the supplemental media rich content trigger includes access information configured to access at least one media rich content server; receives a portion of the media content stream with the supplemental media rich content trigger at the portable media device; establishes a communication link between the portable media device and the media rich
(Continued)

content server based upon the access information in the received supplemental media rich content trigger; receives supplemental media rich content from the media rich content server; and presents at least the received supplemental media rich content on a display of the portable media device.

20 Claims, 4 Drawing Sheets

Related U.S. Application Data

(60) Provisional application No. 61/359,742, filed on Jun. 29, 2010.

(51) Int. Cl.

| | | |
|---|---|---|
| *G06F 17/22* | (2006.01) | |
| *G06F 3/00* | (2006.01) | |
| *H04W 36/00* | (2009.01) | |
| *H04W 72/00* | (2009.01) | |
| *H04N 21/81* | (2011.01) | |
| *H04N 21/472* | (2011.01) | |
| *H04N 21/236* | (2011.01) | |
| *H04N 21/242* | (2011.01) | |
| *H04N 21/41* | (2011.01) | |
| *H04N 21/43* | (2011.01) | |
| *H04N 21/431* | (2011.01) | |
| *H04N 21/434* | (2011.01) | |
| *H04N 21/4402* | (2011.01) | |
| *H04N 21/462* | (2011.01) | |
| *H04N 21/61* | (2011.01) | |
| *H04N 21/222* | (2011.01) | |
| *H04N 21/235* | (2011.01) | |
| *H04N 21/2665* | (2011.01) | |

(52) U.S. Cl.
CPC ..... *H04N 21/23614* (2013.01); *H04N 21/242* (2013.01); *H04N 21/4122* (2013.01); *H04N 21/4126* (2013.01); *H04N 21/4307* (2013.01); *H04N 21/4316* (2013.01); *H04N 21/4348* (2013.01); *H04N 21/4402* (2013.01); *H04N 21/4621* (2013.01); *H04N 21/4622* (2013.01); *H04N 21/47202* (2013.01); *H04N 21/6118* (2013.01); *H04N 21/6143* (2013.01); *H04N 21/8126* (2013.01); *H04N 21/2665* (2013.01)

(58) Field of Classification Search
CPC ....... H04L 41/509; H04L 51/04; H04L 51/36; H04L 51/38
USPC ................ 709/217, 219, 225–226, 230–231; 455/438, 452.1
See application file for complete search history.

(56) References Cited

U.S. PATENT DOCUMENTS

| | | |
|---|---|---|
| 2003/0149983 A1 | 8/2003 | Markel |
| 2003/0229900 A1 | 12/2003 | Reisman |
| 2004/0261130 A1 | 12/2004 | Leak et al. |
| 2007/0094352 A1 | 4/2007 | Choi et al. |
| 2007/0250901 A1 | 10/2007 | McIntire et al. |
| 2008/0152305 A1 | 6/2008 | Ziegler |
| 2009/0132349 A1 | 5/2009 | Berkley et al. |
| 2009/0327894 A1* | 12/2009 | Rakib .................... G11B 27/34 715/719 |
| 2010/0058397 A1 | 3/2010 | Rogers |
| 2010/0312596 A1 | 12/2010 | Saffari et al. |
| 2011/0131602 A1 | 6/2011 | Fuisz |
| 2011/0224992 A1 | 9/2011 | Chaoui et al. |
| 2011/0292992 A1 | 12/2011 | Sirivara |
| 2011/0320627 A1 | 12/2011 | Landow et al. |
| 2013/0031587 A1 | 1/2013 | Yassa |

OTHER PUBLICATIONS

Joint Technical Committe et al.; Hybrid Broadcast Broadband TV; ETSI TS 102 796 V1.1.1 (Jun. 2010) Technical Specification; European Broadcasting Union, CH-1218 Grand Saconnex (Geneva), Switzerland.

P. Ferreira, MXF—A Progress Report; EBU Technical Review—2010 Q3; This version: Jul. 23, 2010; Published by the European Broadcasting Union, Geneva, Switzerland; ISSN: 1609-1469; 12 pages.

* cited by examiner

APPARATUS, SYSTEMS AND METHODS FOR ACCESSING AND SYNCHRONIZING PRESENTATION OF MEDIA CONTENT AND SUPPLEMENTAL MEDIA RICH CONTENT

PRIORITY CLAIM

This application is a continuation of U.S. application Ser. No. 12/968,002, filed Dec. 14, 2010, published as U.S. Publication No. 2011/0320627, and entitled "Apparatus, System And Methods For Accessing And Synchronizing Presentation Of Media Content And Supplemental Media Rich Content," which is a non-provisional of U.S. application Ser. No. 61/359,742, filed Jun. 29, 2010, entitled "Apparatus, System And Methods For Accessing And Synchronizing Presentation Of Media Content And Supplemental Media Rich Content." which is entirely incorporated herein by reference.

BACKGROUND

Media devices, such as a set top box, are configured to receive media content. The received media content may be presented on a media presentation device, such as a television, computer system, game system, or the like. The media content, such as a television program, a broadcast sports event, a movie or the like, is received in the form of a video stream and a synchronized audio stream. Once received and processed, the video stream is presented on a display and the associated audio stream is output from one or more speakers in a synchronized fashion.

A content access device may be employed to communicate the received media content over another system to a user's portable media device. Exemplary portable media devices include, but are not limited to, laptop computers, personal device assistants, cellular-based devices, Internet-based and/or Wi-Fi type devices. The user remotely accesses the media content received by the media device by establishing a sink to the content access device. For example, the user may establish the communication link by interconnecting their portable media device to the Internet, Wi-Fi, and/or cellular system. After connectivity is established to the content access device, the media content may be communicated from the content access device to the portable media device. Accordingly, the user is able to remotely access a program, a movie, or the like, using their portable media device.

In some situations, supplemental media rich content pertaining to the presented media content may be available from other locations. This supplemental media rich content is not included in the media content communicated from the content access device to the portable media device.

Accordingly, there is a need in the arts to access and synchronize presentation of the supplemental media rich content with the remotely accessed media content.

SUMMARY

Systems and methods of accessing supplemental media rich content at a portable media device are disclosed. An exemplary embodiment communicatively couples a portable media device to a media device that initially receives a media content stream comprising at least one supplemental media rich content trigger, wherein the supplemental media rich content trigger includes access information configured to access at least one media rich content server; receives a portion of the media content stream with the supplemental media rich content trigger at the portable media device; establishes a communication link between the portable media device and the media rich content server based upon the access information in the received supplemental media rich content trigger; receives supplemental media rich content from the media rich content server; and presents at least the received supplemental media rich content on a display of the portable media device.

BRIEF DESCRIPTION OF THE DRAWINGS

Preferred and alternative embodiments are described in detail below with reference to the following drawings.

DETAILED DESCRIPTION

Figure 1:
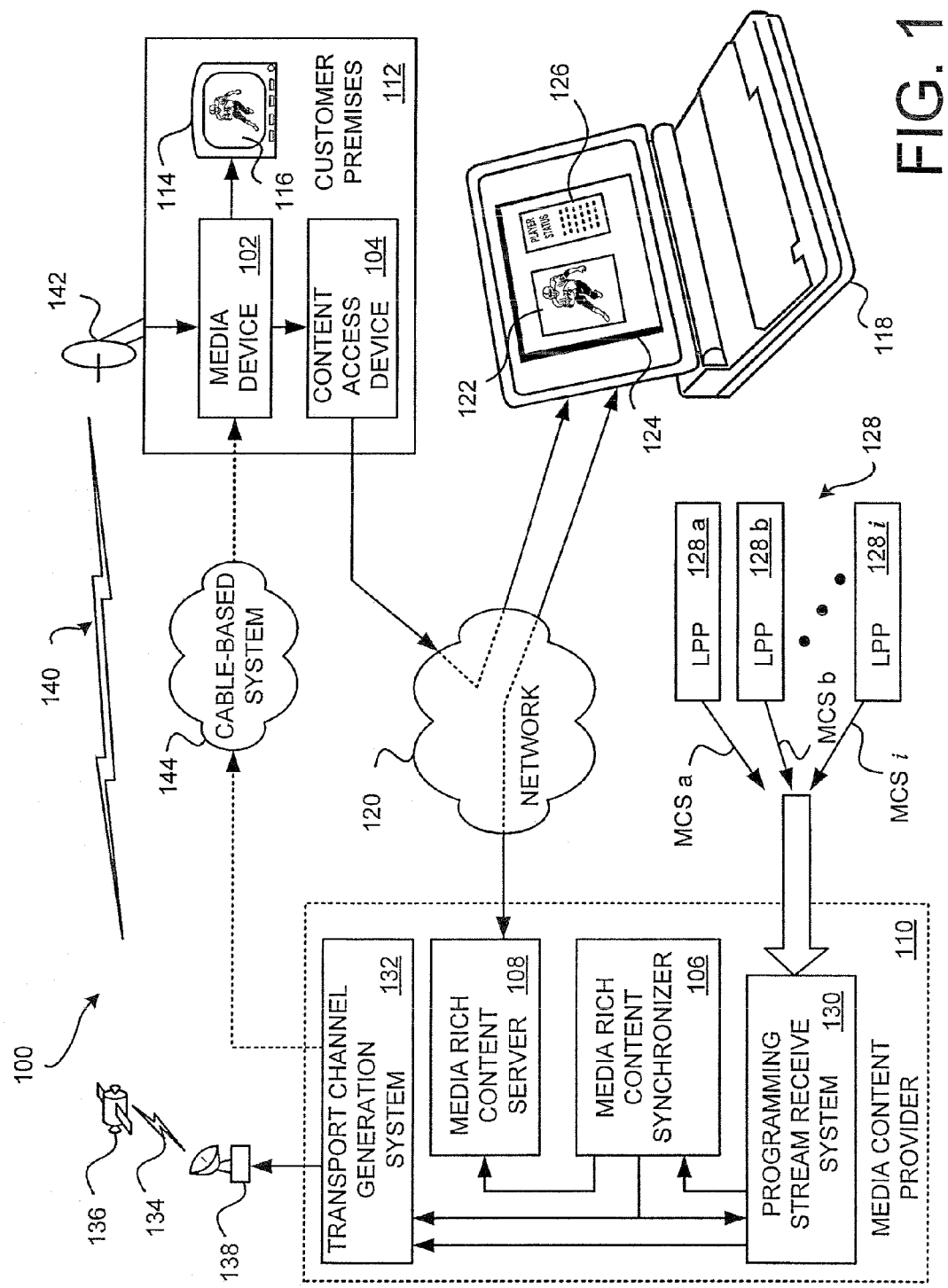
FIG. 1 is a block diagram of an embodiment of a media access system.

FIG. 1 is a block diagram of an embodiment of a media rich content access system 100. Embodiments of the media rich content access system 100 comprise a media device 102, a content access device 104, a media rich content synchronizer 106, and an optional media rich content server 108. Embodiments of the media rich content access system 100 are configured to access supplemental media rich content pertaining to the program of interest that is available from a remote source and that is not included in the media content stream received from the content access device 104. Access to and presentation of the supplemental media rich content is synchronized with presentation of the media content stream. Media rich content is content that pertains to the media content, but is not included as part of the received media content.

In an exemplary embodiment, the media rich content server 108 functions as a repository of supplemental media rich content pertaining to a program of interest. In exemplary embodiments, the media rich content server 108 may store supplemental media rich content for a plurality of different programs of interest. As the selected program of interest is presented to the user on their portable media device 118, embodiments of the media rich content access system 100 are configured to access and present the supplemental media rich content on the portable media device 118 based upon a supplemental media rich content trigger. The supplemental media rich content trigger includes access information that indicates a process for the portable media device 118 to access the media rich content server 108.

Examples of the media device 102 include, but are not limited to, a set top box (STB) or the like, that is configured to receive media content from a media content provider 110. The media device 102 may be located at a customer premises 112, such as their residence, office, or other suitable location. The media device 102 is typically connected to one or more media presentation devices 114. Non-limiting examples of the media presentation devices 114 include televisions (TVs), stereos, surround-sound receivers, radios, digital video disc (DVD) players, digital video recorders (DVRs), game playing devices, or personal computers (PCs). The media presentation device 114 may include a visual display device 116, such as a television (hereafter, generically a TV). Other types of output devices may also be coupled to the media device, such as an audio presentation device and/or those providing any sort of stimuli sensible by a human being, such as temperature, vibration and the like. For example, the media presentation device 114 is illustrated as presenting the video portion of a football game on the display 116.

At times, the user may wish to access the media content received at their media device 102 when they are remote from the customer premises 112. The user operates their portable media device 118 to establish a link to the content access device 104, via the network 120. Exemplary portable media devices 118 include, but are not limited to, laptop computers, personal device assistants (PDAs), netbooks, cellular-based devices, Internet accessible devices, and/or Wi-Fi accessible devices. In an alternative embodiment, the media device 102 and the content access device 104 may be integrated together.

The content access device 104 is controllably connected to the media device 102 and is configured to cause the media device 102, in an exemplary embodiment, to access a particular program of interest in accordance with a specification from the user. In an exemplary embodiment, the user may communicate instructions from their portable media device 118 to the content access device 104 to specify the channel that is providing the program of interest, to specify the station call sign of the source station that is broadcasting the program of interest, and/or to specify another suitable identifier of the program of interest. In some embodiments, the user may specify the program of interest by navigating about an electronic program guide (EPG) that is presented on their portable media device 118. The content access device 104 receives the specified program of interest from the media device 102, and transmits the program of interest to the user's portable media device 118, illustrated in FIG. 1 as a laptop computer.

The content access device 104, in some embodiments, may be configured to reformat or process the program of interest into a format that is compatible with the data requirements of the portable media device 118 and/or that is compatible with a data transmission bandwidth of the communication link to the portable media device 118. For example, the program of interest received from the media device 102 may be in a format that is suitable for presentation of a standard definition or high definition TV. In contrast, the portable media device 118 may be a cellular phone or a laptop computer with a relatively smaller display. Alternatively, or additionally, the communication link to the portable media device 118 may not have sufficient bandwidth to transmit the program of interest to the portable media device 118. In such situations, the content access device 104 processes the program of interest into a format that is suited for presentation on a smaller display and/or processes the program of interest in a format that is suited for transmission over the established link between the content access device 104 and the portable media device 118.

Some supplemental information pertaining to the program of interest may be included in the media content stream. For example, a movie producing entity may produce a movie. When the movie is available to the media content provider for distribution to its customers, the movie is processed to include the supplemental information, such as actor names, production location, date of production, or the like.

However, other supplemental media rich content pertaining to the movie may be available from other sources, such as a web site or the like. Such supplemental media rich content is not included in the media content that is communicated from the content access device 104 to the portable media device 118.

In the absence of embodiments of the media rich content access system 100, the user has to access such supplemental media rich content by separately accessing a web site or the like so that the supplemental media rich content is retrieved and then presented on their portable media device 118. For example, an internet site may provide supplemental media rich content pertaining to the currently received program, sporting event or movie. If the user is interested in accessing a web site or the like that provides supplemental media rich content related to the object of interest, or even allows purchase of the object of interest, the user may make a mental note of the object of interest so that they may later find a suitable website pertaining to the object of interest. In some situations, the user might even write themselves a descriptive note or the like so as to improve their recall of the object of interest when they later go to find and access the website.

As another example, a sports broadcasting entity may be broadcasting a football game that is communicated to the user's media device 102 and/or portable media device 118. The user may wish to view the presentation of the football game while at a remote location. The user operates their portable media device 118 to establish a link to the content access device 104 and requests presentation of the football game. The football game is communicated from the media device 102 to the content access device 104. The content access device 104 then communicates the football game, over the network 120, to the portable media device 118. The user is then presented a video image 122 of the football game on the display 124 of the portable media device 118. With respect to the received football game, the supplemental media rich content may comprise team or player statistics pertaining to the received football game. Player, team, and/or game merchandise may also be available from the web site. Thus, the player statistics and or merchandising information are then concurrently presented as graphical content 126 on the display 124. Alternatively, or additionally, the supplemental media rich content may be audio information that is heard by the user Embodiments of the media rich content access system 100 are configured to cause the portable media device 118 to access the supplemental media rich content by accessing the media rich content server 108. Received media content includes access information that defines a process for the portable media device 118 to access the media rich content server 108. Based on the access information, the portable media device 118 establishes a separate link to the media rich content server 108, and retrieves the team or player statistics from the media rich content server 108. The supplemental media rich content, such as the team or player statistics, is then presented along with the presented football game.

To access the supplemental media rich content, exemplary embodiments of the media rich content access system 100 incorporate trigger information in a supplemental media rich content trigger that is included in the media content stream. The supplemental media rich content trigger may be embedded in the video stream, the audio stream, and/or a metadata stream of the program of interest. Alternatively, or additionally, the trigger information may be separately communicated to the portable media device 118.

In an exemplary embodiment, presentation of the graphical content 126 is synchronized with presentation of the program of interest. The supplemental media rich content trigger information includes synchronizing information that synchronizes the presentation of the program of interest and the presentation of the graphical content 126 on the portable media device 118. In an exemplary embodiment, the synchronizing information identifies, or is associated with, one or more frames of the video content of the program of interest. As the associated frame of video information is processed for presentation on the portable media device 118, the trigger information in the supplemental media rich content trigger is concurrently processed to cause the portable media device 118 to access and synchronously present the supplemental media rich content.

In an exemplary embodiment presentation of the supplemental media rich content received from the media rich content server 108 is closely synchronized with presentation of the program of interest. For example, but not limited to, the program of interest may be presenting a live football game. The length of a completed pass play to the player (the supplemental media rich content) may be presented as text in the graphical content 126. The graphical content 126 may then be presented in real time, or near-real time, after the play is completed. Alternatively, or additionally, different views (the supplemental media rich content) of the playing field may be presented as the graphical content 126.

Alternatively, presentation of the graphical content 126 with the supplemental media rich content may be relatively loosely synchronized with presentation of the program of interest. That is, the temporal relationship between the presentation of the program of interest and the presentation of the graphical content 126 may be different. For example, but not limited to, the graphical content 126 may present replays of the most recent play, or a selected previous play, of the football game.

As another example of loosely synchronized presentation of the graphical content 126 with the supplemental media rich content, the program of interest may be a news story program that has a relatively long segment pertaining to a particular topic. The graphical content 126 may be presented at any convenient time during the segment of the news program. The duration of the presented graphical content 126 may be less, or may even be longer, than the duration of the news program segment. Thus, the presentation of the graphical content 126 may span across multiple topic segments of the news story program.

Alternatively, or additionally, the graphical content 126 may present supplemental media rich content that does not pertain to the program of interest. For example, but not limited to, the supplemental media rich content may pertain to a story or a topic that is different from the subject matter of the currently presented program of interest. For example, but not limited to, the graphical content 126 may be an advertisement or an indication of program content that will be available at some future time.

The graphical content 126 with the supplemental media rich content may be presented on the portable media device 118 using any desirable presentation format. The presentation format may depend upon the nature of the program of interest, may depend upon the nature of the supplemental media rich content, may depend upon the context of the supplemental media rich content relative to the program of interest, and/or may depend upon characteristics of the particular portable media device 118. The program of interest and the graphical content 126 with the supplemental media rich content may be presented in any suitable manner that entrances the viewing and/or listening experience of the user.

For example, the program of interest and the graphical content 126 may be presented in a side-by-side format as illustrated in FIG. 1. Alternatively, the graphical content 126 may be overlaid on top of, or over a portion of, the presented program of interest. The graphical content 126 may be presented using a watermark format wherein the supplemental media rich content is presented using some degree of transparency over the presented program of interest.

Alternatively, or additionally, embodiments may permit the user to selectively toggle between the presented program of interest and the presented graphical content 126 with the supplemental media rich content. For example, when the display 124 of the portable media device 118 is relatively small, such as on a cellular phone, PDA, or the like, there may not be sufficient area on the display 124 to show both the program of interest and the graphical content 126 with sufficient resolution and/or size. Accordingly, the graphical content 126 is presented separately from the program of interest.

Alternatively, or additionally, the graphical content 126 may be separately presented for some predefined duration and/or may be configured to await a response from the user. Alter expiration of the predefined duration and/or selection by the user, presentation of the graphical content 126 ends.

Alternatively, or additionally, when the graphical content 126 is separately presented, some embodiments may be configured to pause the presentation of the program of interest. Presentation of the program of interest may then be resumed after presentation of the graphical content 126 ends. Alternatively, presentation of the program of interest may resume at its real time.

Yet another presentation format may present the graphical content 126 with the supplemental media rich content in a banner form that presents text and or images. The graphical content 126 with the supplemental media rich content may even be presented as information that scrolls across the banner.

In some applications, the graphical content 126 with the supplemental media rich content may be interactive with the user. In an exemplary embodiment, the graphical content 126 may present a choice to the user that is intended to be responded to by the user. For example, the user may be able to vote on a issue or the like that is related to the presented program of interest. Or, the graphical content 126 may be an advertisement that is configured to allow the user to selectively purchase a product. The advertisement may be related to, or may not be related to, the subject matter of the presented program of interest. For example, the advertisement (the supplemental media rich content) may be targeted to the user of the portable media device 118, and may optionally replace other advertisements presented in the program of interest received from the content access device 104.

In an exemplary embodiment, the graphical content 126 with the supplemental media rich content may comprise a pop-up window and/or an interactive graphical icon. The information used to generate and present the pop-up window and/or the graphical icon may be included as part of the trigger information. Alternatively, or additionally, the pop-up window and/or the graphical icon may be provided from the media rich content server 108 after the portable media device 118 has initially accessed the media rich content server 108.

In another exemplary embodiment, the presented graphical content 126 may permit the playing of a game or the like. A special control panel, consol, or the like may be presented around the presented image of the program of interest to provide interactive capability between the user, the game, and the presented program of interest. The user may interact with the graphical content 126 with the supplemental media rich content by inputting commands and/or instructions using their portable media device 118. In some interactive game applications, the user may toggle or switch between game playing enabled by the graphical content 126 and the presentation of the program of interest.

In an exemplary embodiment, the graphical content 126 with the supplemental media rich content may include links to other sources of supplemental media rich content other than the supplemental media rich content that is available from the media rich content server 108. For example, the graphical content 126 may present a uniform resource locator (URL) or the like that is selectable by the user. Alternatively, or additionally, the graphical content 126 with the supplemental media rich content may be an entirely different program, or enable access to and presentation of an entirely different program. For example, a program that is available from a video on demand (VOD) system or another channel may be selected by the user.

Alternatively, or additionally, the supplemental media rich content may present audio information on the portable media device 118. For example, if the program of interest is a football game, the supplemental media rich content may comprise audio commentary from a commentator that is not otherwise included in the audio channel of the football game.

Some embodiments may be configured to provide the user the choice of being presented the supplemental media rich content on their portable media device 118. For example, the trigger information may cause the portable media device 118 to access the media rich content server 108. If supplemental media rich content is available, a pop-up window and/or a graphical icon may be presented to the user on the display 124 of the portable media device 118 to invite the user to receive the supplemental media rich content and/or to interactively participate in any available interactivity provided by the supplemental media rich content. Upon selection of the pop-up window and/or other graphical icon, the graphical content 126 with the supplemental media rich content is then presented on the portable media device 118. Some embodiments may present an audible alarm or audible notification that indicates to the user that supplemental media rich content is available. Upon hearing the audible alarm or audible notification, the user may then optionally operate the portable media device 118 to access the supplemental media rich content.

An identifier of the portable media device 118 may be received by the media rich content server 108. Accordingly, the format of the graphical content 126 and/or the supplemental media rich content may be tailored tor presentation on that particular portable media device 118. The identifying information may be a serial number, a cellular number, a device make and/or model identifier, or another suitable identifier that indicates the type of and/or characteristics of the portable media device 118. For example, the portable media device 118 may be a very simple cellular phone with a small display 124. The media rich content server 108 may then provide the graphical content 126 and/or the supplemental media rich content that is suitable for presentation on that particular display. On the other hand, the portable media device 118 may be an advanced electronic device where the display 124 is touch sensitive and relatively large. The media rich content server 108 may then provide the graphical content 126 and/or the supplemental media rich content in a larger size, and may optionally include interactive features that are configured to be responsive to input from the touch sensitive display 124.

In some embodiments, prior received trigger information may cause the portable media device 118 to establish a connection to the remote location providing the supplemental media rich content. A second trigger may cause the portable media device 118 to then retrieve the supplemental media rich content over the pre-established link. In some embodiments, a later received trigger may end display of the graphical content 126 with the supplemental media rich content, and/or cause a change to different supplemental media rich content.

The user may, at times, be at the customer premises 112 and may be viewing (or listening to) the program of interest on the media presentation device 114. When at the customer premises 112, the user may choose to access the supplemental media rich content using their portable media device 118. For example, the user may be viewing the football game at home on their TV (the media presentation device 114). The user may concurrently access the supplemental media rich content which presents the team and/or player statistics using their portable media device 118, such as their cellular phone or laptop computer. Accordingly, the team or player statistics are presented to the user on the display of the cellular phone device or laptop computer without interfering with presentation of the football game. As another example, the user may temporarily leave the room where the media presentation device 114 is located, such as when they go to the kitchen to get a snack or go to the bathroom. The user may continue viewing the program of interest and the associated supplemental media rich content on their portable media device 118 during such times.

In the exemplary embodiment of FIG. 1, the network 120 is illustrated as a generic communication system. In an exemplary application, the network 120 comprises the Internet. Alternatively, or additionally, the communication network 120 may be a telephony system, a radio frequency (RF) wireless system, a microwave communication system, a fiber optics system, an intranet system, a local access network (LAN) system, a local network, an Ethernet system, a cable system, a radio frequency system, a cellular system, an infrared system, or a hybrid system comprised of multiple types of communication media.

In the various embodiments, the portable media device 118 comprises a suitable modem or other component that is configured to cause the portable media device 118 to connect to the Internet. Alternatively, or additionally, the portable media device 118 may have a wireless transceiver that is configured to provide connectivity to a wireless system, such as a Wi-Fi system or the like. Alternatively, or additionally, the portable media device 118 may include a RF transceiver or the like that provides connectivity to a cellular network.

To facilitate disclosure of an exemplary embodiment of the media rich content access system 100, operation of an exemplary environment that provides media content to the media device 102 is disclosed. A media content provider 110 receives media content from a plurality of local program providers (LPPs) 128 or other content providers.

The media content provider 110 receives the plurality of media content streams MCSa-MCSi from many different LPPs 128 at its programming stream receive system 130. The programming stream receive system 130 processes the received media content streams MCSa-MCSi as necessary to prepare them for transmission to the customers. For example, commercials or the like may be incorporated with a particular one of the media content streams MCSa-MCSi. Further, the media content streams MCSa-MCSi may be associated with identifiers, such as channel number and/or station call signs.

The processed media content streams MCSa-MCSi are communicated from the programming stream receive system 130 to the transport channel generation system 132. In an exemplary satellite-based media system, the transport channel generation system 132 bundles selected ones of the media content streams MCSa-MCSi into one or more transport channels 134. Then, one or more of the transport channels 134 are uplinked to a satellite 136, via a corresponding transmit antenna 138. The respective transport channels 134 are then communicated from the satellite 138 down to a receiver antenna 142 located at the customer premises 112. The received wireless signal 140 with the transport channel(s) 134 therein is then communicated to the media device 102. The receiver antenna 142 and the media device 102 may be configured to receive multiple transport channels from a plurality of satellites 136.

Alternatively, or additionally, media content may be provided to the media device 102 over other systems. For example, but not limited to, the media content system provider 110 may communicate media content over a cable-based system 144. The cable-based system 144 may use a fiber optic cable, a coaxial cable, or the like that couples the media device 102 to the cable-based system 144.

Media content and the trigger information may be communicated to the media device 102 and/or to the portable media device 118 using other media. For example, the media content and the trigger information may be communicated over the Internet.

In another situation, the media content and the trigger information may be provided from a memory medium, such as a digital video disk (DVD) or the like. When the program of interest is retrieved from the memory medium, the trigger information incorporated therein causes the portable media device 118 to access and present the supplemental media rich content.

In some embodiments, the program of interest may be saved into a storage medium or device, such as a digital video recorder (DVR) residing in the media device 102, saved into a hard drive residing in the portable media device 118, or saved into an external memory device that is coupled to the media device 102, the media presentation device 114, and/or the portable media device 118. The associated trigger information may also be saved. When the stored program of interest is accessed by the portable media device 118, then the supplemental media rich content is accessed and presented to the user based upon the stored trigger information.

The graphical content 126 and/or the supplemental media rich content may be created in a variety of manners. In an exemplary embodiment, the graphical content 126 and/or the supplemental media rich content is created by the particular LPP 128 that is originating the program of interest. The graphical content 126 and/or the supplemental media rich content is communicated from the originating LPP 128 to the programming stream receive system 130. In other situations, the graphical content 126 and/or the supplemental media rich content may be communicated from the originating LPP 128 directly to the media rich content synchronizer 106.

In an exemplary embodiment, the media rich content synchronizer 106 generates the supplemental media rich content trigger 214 based upon the access information used to establish the communication link between the portable media device 118 and the content access device 104. The access information may also specify precisely what supplemental media rich content is to be accessed from the content access device 104. Also, information is provided to the media rich content synchronizer 106 that defines where in the media content stream the generated supplemental media rich content trigger 214 is to be added. The media rich content synchronizer 106 then receives the media content and adds the supplemental media rich content trigger 214 into the media content stream at the predefined locations of the media content stream so that when the media content stream is processed by the portable media device 118, the media content and the supplemental media rich content are presented in a synchronized fashion.

In an alternative embodiment, the graphical content 126 and/or the supplemental media rich content may be communicated from the programming stream receive system 130 to the media rich content server 108. The media rich content server 108 may then save the graphical content 126 and/or the supplemental media rich content for later access by the portable media device 118.

Alternatively, or additionally, the graphical content 126 and/or the supplemental media rich content may originate from another source. The graphical content 126 and/or the supplemental media rich content originating from other sources can then be communicated to the media rich content server 108 and/or the media rich content synchronizer 106. The received graphical content 126 and/or the supplemental media rich content may then be saved for later access by the portable media device 118. Further, the trigger information may be generated based on the supplemental media rich content originating from the other source.

Figure 2:
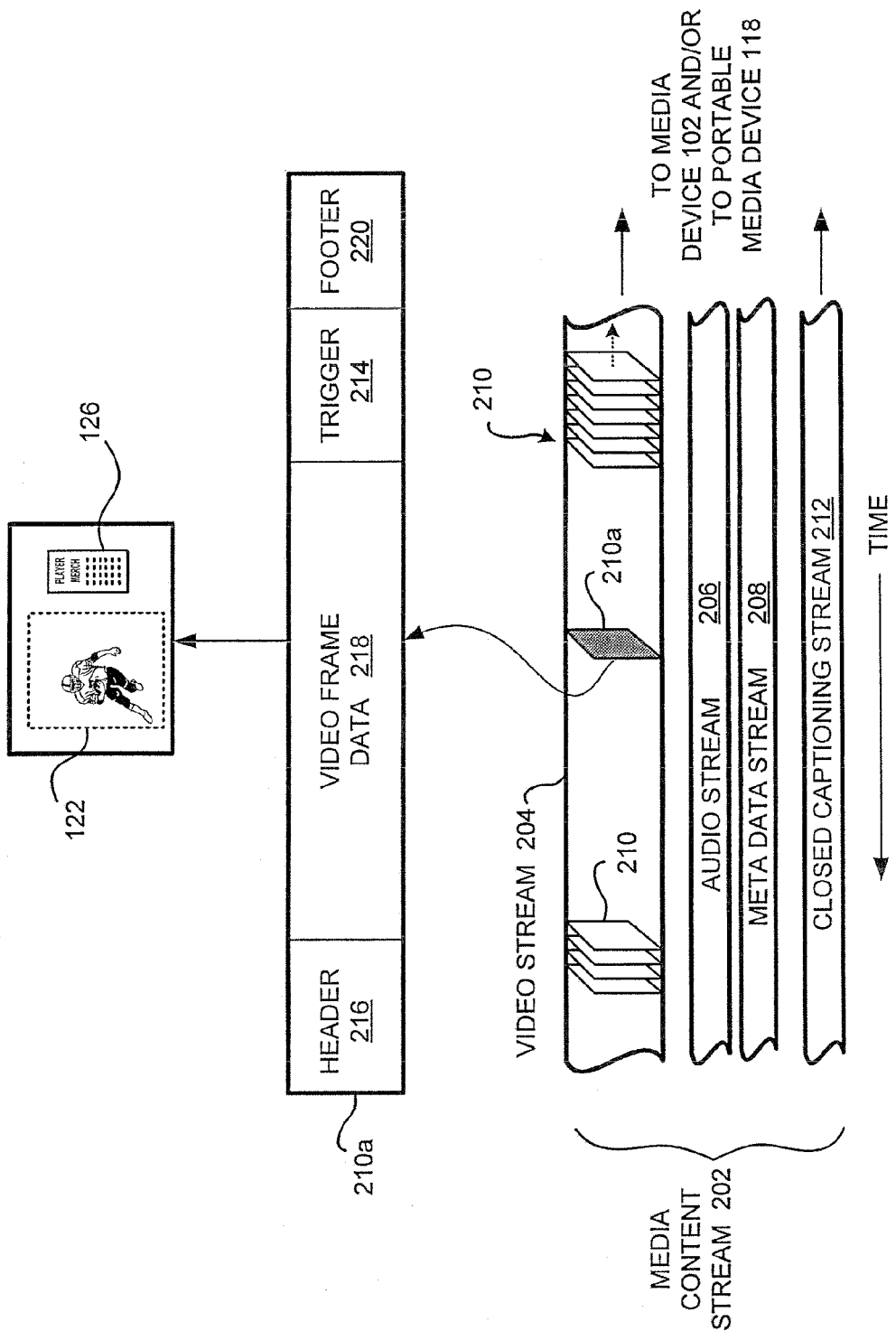
FIG. 2 conceptually illustrates a media content stream.

FIG. 2 conceptually illustrates a media content stream 202 that communicates, transports, or otherwise carries, the program of interest to the media device 102 and/or the portable media device 118. The media content stream 202 comprises a video stream 204, a corresponding audio stream 206, and a corresponding metadata stream 208.

The video stream 204 is comprised of a plurality of serially sequenced video frames 210. Each video frame 210 has data or information used to render and present a particular image of the program of interest. The video frames 210 are serially presented so as to create a moving picture. For example, the video frame 210a is used to generate the presented image that is associated with the graphical content 126.

The exemplary video frames 210 comprise a header 216, video frame data 218, supplemental media rich content trigger 214, and a footer 220. The header 216 includes information that identifies the start of each video frame 210, and may include information that identifies various characteristics of the video frame 210. The footer 220 includes information that identifies the end of each video frame 210, and may also include information that identifies various characteristics of the video frame 210. The video frame data 218 includes the video data or information that is used to render the image that is presented on the displays 116 and/or 124.

The audio stream 206 may include spoken words, music, and background sounds. The audio stream 206 is sequenced with the video frames 210 such that spoken words, music, and background sounds of the audio stream 206 correspond in time with the moving picture. Some program streams 202 may include a metadata stream 208 which contains other information of interest.

An optional closed captioning stream 212 is also conceptually illustrated as part of the media content stream 202. The closed captioning stream 212 is typically a textual presentation of the words of the audio stream 206 for hearing impaired viewers or for viewers in an area with relatively loud ambient noise levels, such as a bar or the like. The words of the closed captioning stream 212 are sequenced so as to generally correspond to the spoken words of the audio stream 206.

To provide synchronized access to the supplemental media rich content, exemplary embodiments of the media access system 100 incorporate information in a supplemental media rich content trigger 214 that resides somewhere in the media content stream 202, such as, but not limited to, in the video stream 204. When a video frame 210 is processed by the portable media device 118 for presentation, the supplemental media rich content trigger 214 is processed such that the supplemental media rich content is accessed and the graphical content 126 is presented in synchronization with the presented video frame 210.

In the illustrated exemplary embodiment, the supplemental media rich content trigger 214 is embedded or otherwise incorporated into the video frame 210. For example, recent moving picture experts group (MPEG) formats, the material exchange format (MXF), and other packetized video formats, now provide for portions in the video stream 204 that are configured to carry various non-video data. In exemplary embodiments, the supplemental media rich content trigger 214 may reside in or may be otherwise incorporated into any portion of the video frame 210.

In other embodiments, the trigger 214 may be interleaved or otherwise incorporated between video frames 210. For example, the trigger 214 may be added or inserted into the video stream 204 between the video frame 210 associated with the generated trigger and an adjacent video frame 210. Alternatively, the trigger 214 may be embedded or otherwise incorporated into the audio stream 206, the metadata stream 208, and/or the closed captioning stream 212 of the media content stream 202. Alternatively, or additionally, the trigger 214 may be separately communicated to the media device 102 and/or the portable media device 118.

In an exemplary embodiment, each particular video frame 210 that presents a scene with the associated with supplemental media rich content includes the supplemental media rich content trigger 214.

In an exemplary embodiment, the trigger information in at least one of the supplemental media rich content triggers 214 comprises information used to establish the communication link between media rich content server 108 and the content access device 104, and/or establish the communication link between the media rich content server 108 and the portable media device 118. For example, the access information included in the trigger information may comprise a web site address and/or other information to access the particular media rich content server 108 having the supplemental media rich content. When the supplemental media rich content trigger 214 having the information to establish the communication link to the media rich content server 108 is processed, embodiments automatically cause the portable media device 118 to establish the communication link to the media rich content server 108.

In some embodiments, once the communication link is established, subsequent supplemental media rich content triggers 214 do not need to have the information to establish and/or maintain the communication link so long as the communication link remains established when that subsequent supplemental media rich content trigger 214 is processed. In some embodiments, a later processed supplemental media rich content trigger 214 may have information that closes the communication link to the media rich content server 108, and/or that causes a change to different graphical content 126 presenting different supplemental media rich content.

In alternative embodiments, some of the trigger information may be embedded in or otherwise incorporated into selected portions of the audio stream 206, the metadata stream 208, and/or the closed captioning stream 212 of the media content stream 202. For example, but not limited to, the audio stream 206 may include a supplemental media rich content trigger 214 to provide synchronized access to supplemental media rich content that is related to the audio track of the presented media content.

In an exemplary embodiment, the trigger information is generated by the media rich content synchronizer 106. The media rich content synchronizer 106 receives the access information that is used to configure the portable media device 118 to establish the communication link to the media rich content server 108. Also, information is provided that specifies the particular supplemental media rich content that is to be accessed at the media rich content synchronizer 106. This information may be provided from any source(s). Then, the information is used to generate the supplemental media rich content trigger 214. The media rich content synchronizer 106 also receives the media content stream, and adds the generated supplemental media rich content trigger 214 into the media content stream at the locations where the portable media device 118 to intended to access the supplemental media rich content from the media rich content server 108. The media content stream with the supplemental media rich content trigger(s) 214 is then communicated to the media device.

The trigger information may optionally include information that is used to associate the supplemental media rich content with a particular program of interest. For example, the supplemental media rich content may include identifying information that identifies the channel, name, or other identifier of the program of interest. Further, the supplemental media rich content may identify where the supplemental media rich content may be accessed.

Figure 3:
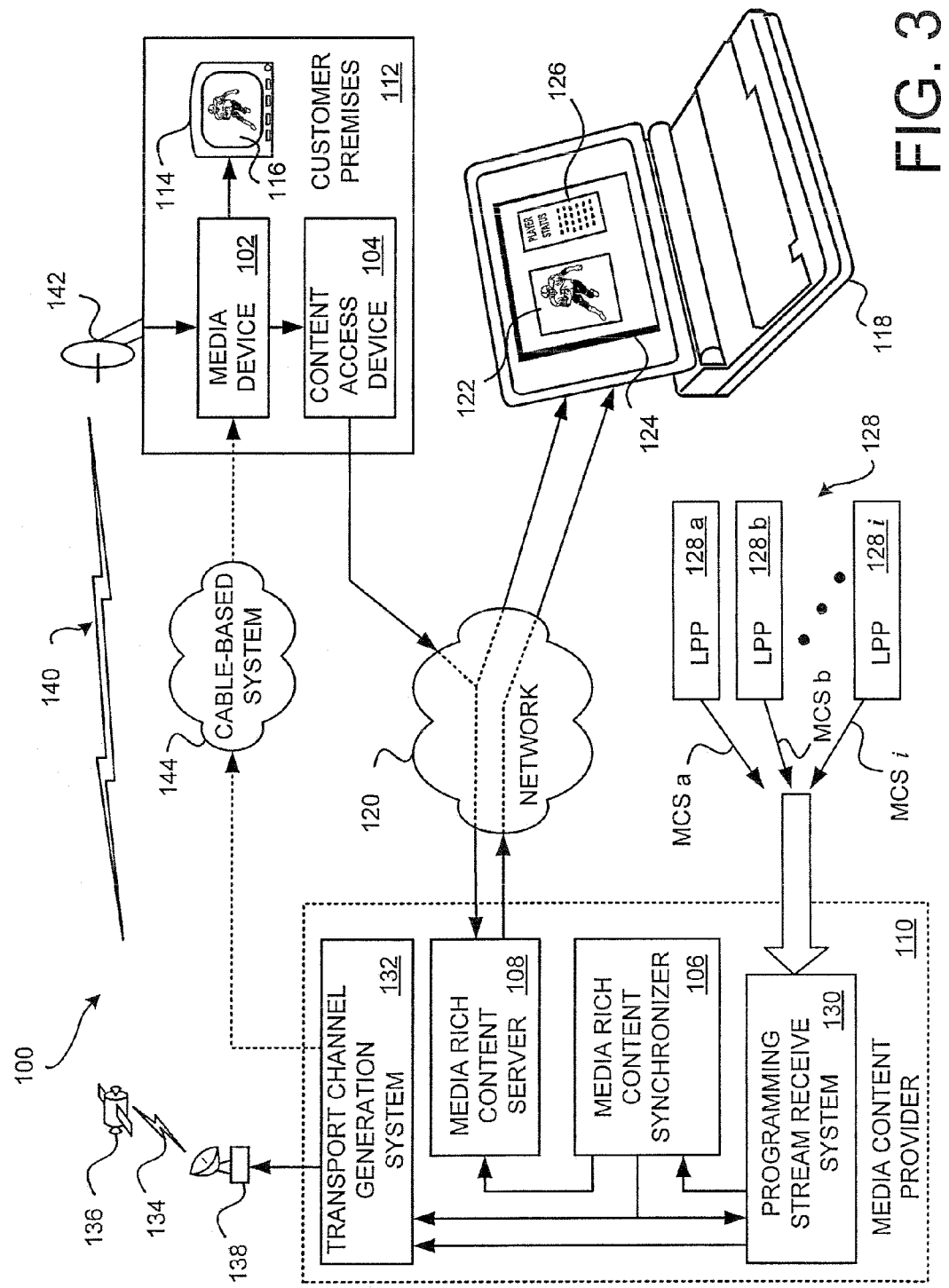
FIG. 3 is a block diagram of an alternative embodiment of the media access system.

FIG. 3 is a block diagram of an alternative embodiment of the media rich content access system 100. In this embodiment, the program of interest, is also received by the media rich content server 108. The media rich content server 108 monitors for the trigger information, and then transmits the supplemental media rich content to the portable media device 118. For example, the supplemental media rich content may be an interactive process that requires a relatively fast paced interaction with the user. By monitoring the trigger information at the media rich content server 108, the supplemental media rich content may be more quickly communicated to the portable media device 118.

In some instances, the portable media device 118 may initially establish a link to the media rich content server 108. In other instances, the media rich content server 108 may be configured to locate and establish the communication link with the portable media device 118 if such information is provided by the content access device 104 that is pushing the program of interest to the portable media device 118.

Figure 4:
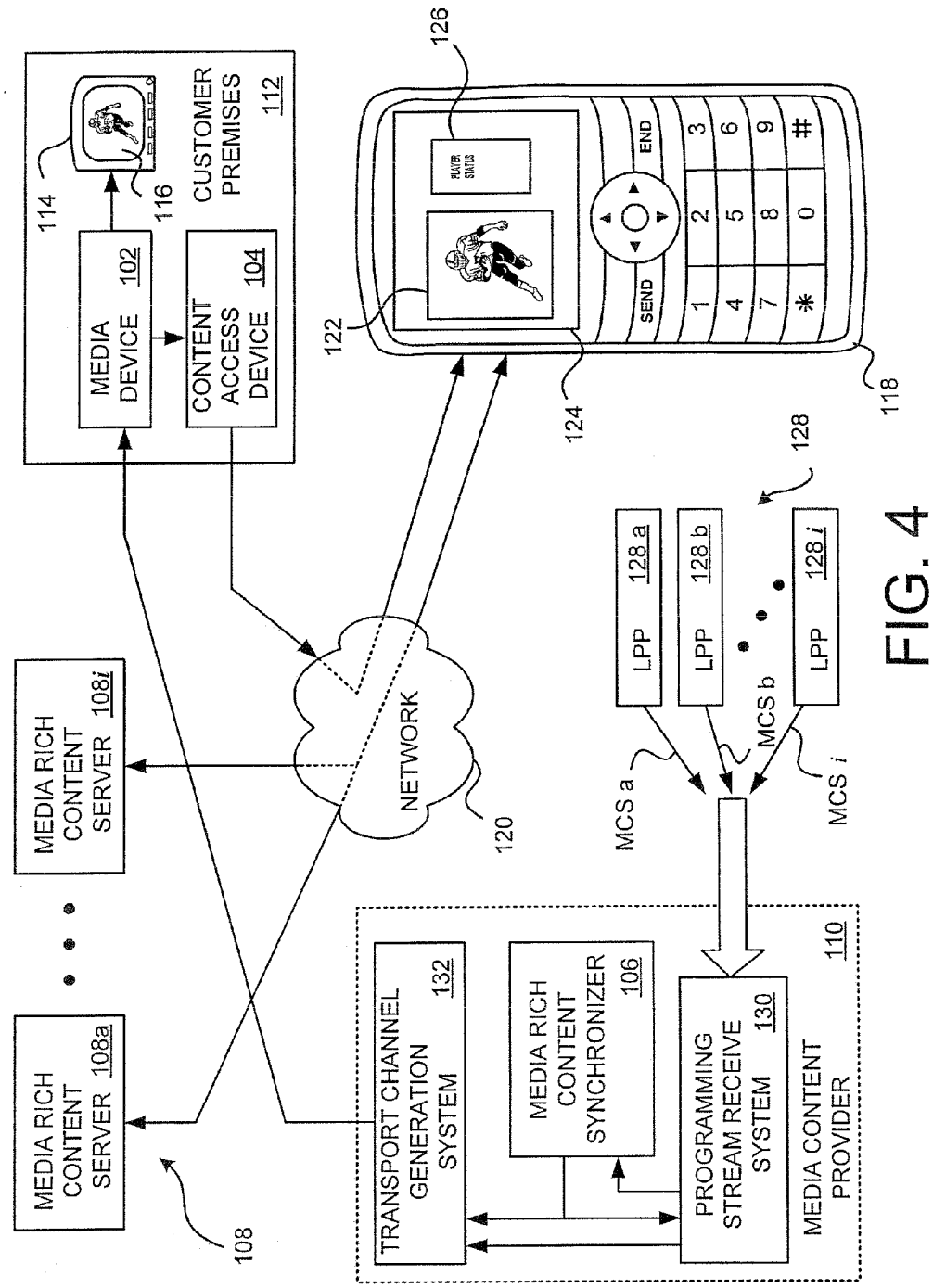
FIG. 4 is a block diagram of an embodiment of the media access system that employs a plurality of remotely located media rich content servers.

FIG. 4 is a block diagram of an embodiment of the media rich content access system 100 that employs a plurality of remotely located media rich content servers 108. The plurality of media rich content servers 108 may be located at any desired location where access to the network 120 is available. The trigger information includes sufficient information to identify the location of and to establish a link with, the particular one of the media rich content servers 108 that has the supplemental media rich content associated with the program of interest that is being provided by the content access device 104.

In this exemplary application, the portable media device 118 is a cellular device that is configured to transmit and receive phone calls and/or to provide other media functions. In some instances, the user operates their portable media device 118 to establish a link to the content access device 104. In other instances, the trigger information automatically establishes a link between the portable media device 118 and the media rich content server 108 that is providing the supplemental media rich content associated with the program of interest. Alternatively, the user may manually establish a link to the media rich content server 108 that is providing the supplemental media rich content.

In some situations, the media rich content synchronizer 106 and/or the media rich content server 108 are located remote from the location of the media content provider 110. For example, the media rich content server 108 may be located at the LPP 128 that originates the program of interest. The user then directly accesses the media rich content server 108 located at that particular LPP 128. As another example, the media rich content synchronizer 106 may be located at the LPP 128 that originates the program of interest. The may be generated at the LPP 128 and inserted into or incorporated with the media content stream that is provided to the media content provider 110.

In the various embodiments, the media rich content servers 108 are configured to be concurrently accessible by a plurality of different ones of the content access devices 104 and/or the portable media devices 118. Thus, a single media rich content server 108 may provide the same, or may provide different, supplemental media rich content to a plurality of concurrently connected content access devices 104 and/or the portable media devices 118 based on selected objects of interest.

It should be emphasized that the above-described embodiments of the media rich content access system 100 are merely possible examples of implementations of the invention. Many variations and modifications may be made to the above-described embodiments. All such modifications and variations are intended to be included herein within the scope of this disclosure and protected by the following claims.

The invention claimed is:

1. A method, comprising:
communicatively coupling a portable media device to a content access device via a network,
wherein the content access device is located at a customer premises,
wherein the portable media device is remote from the customer premises,
wherein a media device at the customer premises that is communicatively coupled to the content access device initially receives a program of interest in a media content stream from a media content provider,
wherein the program of interest comprises video content, audio content, and a supplemental media rich content trigger, and
wherein the supplemental media rich content trigger includes access information configured to enable the portable media device to access supplemental media rich content at a media rich content server via the network;
communicating the program of interest with the supplemental media rich content trigger from the media device to the content access device;
communicating the program of interest with the supplemental media rich content trigger from the content access device to the portable media device over the network;
presenting the video content of the program of interest on a display of the portable media device, wherein a portion of the video content presents an image of an object that is associated with the supplemental media rich content trigger;
establishing, at the portable media device, a communication link over the network between the portable media device and the media rich content server, wherein the communication link is established based upon the access information in the received supplemental media rich content trigger;
receiving a user selection corresponding to a selection of the object presented in the video content;
receiving, at the portable media device and in response to the received user selection of the object, the supplemental media rich content from the media rich content server via the network, wherein the supplemental media rich content includes graphical content that is associated with the object;
concurrently presenting the received graphical content of the supplemental media rich content that is associated with the object and the video content of the program of interest on the display of the portable media device;
ending presentation of the received graphical content of the supplemental media rich content after a predefined duration that begins when the received graphical content is initially presented on the display of the portable media device;
receiving a user selection corresponding to a request to end presentation of the received graphical content of the supplemental media rich content, wherein the user selection is received before the end of the predefined duration; and
ending presentation of the received graphical content of the supplemental media rich content in response to receiving the user selection.

2. The method of claim 1, wherein the graphical content of the supplemental media rich content is different from the video content of the program of interest, and wherein the graphical content of the supplemental media rich content presents supplemental information pertaining to the object presented in the video content presented on the display of the portable media device.

3. The method of claim 1, further comprising:
automatically ending presentation of the graphical content of the supplemental media rich content in response to the object no longer being presented in the video content presented on the display of the portable media device,
wherein the graphical content of the supplemental media rich content remains concurrently presented with the video content of the program of interest on the display of the portable media device so long as the object remains in the video content being presented on the display of the portable media device during the predefined duration.

4. The method of claim 3, wherein after presentation of the graphical content has ended, the method further comprising:
closing the communication link that was established between the portable media device and the media rich content server; and continuing presentation of the program of interest on the display of the portable media device.

5. The method of claim 1, further comprising:
automatically ending presentation of the graphical content of the supplemental media rich content after the predefined duration, wherein the predefined duration begins after the object is no longer being presented in the video content presented on the display of the portable media device.

6. The method of claim 5, wherein after presentation of the graphical content has ended, the method further comprising:
closing the communication link that was established between the portable media device and the media rich content server; and
continuing presentation of the program of interest on the display of the portable media device.

7. The method of claim 1, wherein establishing the communication link over the network between the portable media device and the media rich content server occurs in response to receiving the user selection corresponding to the selection of the object.

8. The method of claim 1, wherein establishing the communication link over the network between the portable media device and the media rich content server automatically occurs in response to receiving the supplemental media rich content trigger in the received program of interest.

9. The method of claim 1, wherein the content access device and the media device are integrated together into an electronic device.

10. A media system, comprising:
a media device operable to receive a broadcast of a media content stream,
wherein the media content stream includes a program of interest,
wherein the program of interest comprises video content, audio content, and a supplemental media rich content trigger, and
wherein the supplemental media rich content trigger includes access information configured to enable a portable media device to access supplemental media rich content at a media rich content server via a network; and
a content access device communicatively coupled to the media device and to a portable media device with a display,
wherein the program of interest is communicated from the content access device to the portable media device via the network and is presented on the display of the portable media device,
wherein a portion of the video content presents an image of an object that is associated with the supplemental media rich content trigger,
wherein the portable media device receives supplemental media rich content from the media rich content server based on the access information in the received supplemental media rich content trigger,
wherein the supplemental media rich content includes graphical content that is associated with the object,
wherein the received graphical content and the video content of the program of interest are concurrently presented on the display of the portable media device,
wherein presentation of the received graphical content of the supplemental media rich content ends after a predefined duration that begins when the received graphical content is initially presented on the display of the portable media device;
wherein when a user selection is received before the end of the predefined duration and corresponds to a request to end presentation of the received graphical content of the supplemental media rich content, presentation of the received graphical content of the supplemental media rich content, presentation of the received graphical content of the supplemental media rich content ends in response to receiving the user selection.

11. The media system of claim 10, wherein the media device and the content access device are integrated together into an electronic device.

12. The media system of claim 10 wherein during the predefined duration, presentation of the graphical content of the supplemental media rich content on the display of the portable media device ends in response to the object no longer being presented in the video content presented on the display of the portable media device.

13. The media system of claim 10, wherein presentation of the graphical content of the supplemental media rich content on the display of the portable media device automatically ends after the predefined duration that begins after the object is no longer being presented in the video content presented on the display of the portable media device.

14. The media system of claim 10, further comprising:
a media content provider that broadcasts the program of interest that is received by the media device,
wherein the media content provider comprises:
a programming stream receive system that receives a plurality of programs from a plurality of local program providers, wherein the program of interest is one of the plurality of programs;
a media rich content synchronizer communicatively coupled to the programming stream receive system and configured to:
receive the program of interest from the programming stream receive system;
generate the supplemental media rich content trigger based upon the access information that is used to establish a communication link between the portable media device and the media rich content server; and
add the supplemental media rich content trigger into the media content stream at a location in the media content stream that is associated with presentation of the image of the object,
wherein, when the supplemental media rich content trigger in the media content stream is processed by the portable media device, the portable media device presents the graphical content and the video content of the program of interest in a synchronized fashion.

15. The media system of claim 14, wherein the media content provider further comprises:
the media rich content server that is communicatively coupled to the media rich content synchronizer,
wherein the media rich content server receives the graphical content of the supplemental media rich content that is associated with the object from the media rich content synchronizer,
wherein the media rich content server stores the graphical content, and
wherein the media rich content server communicates the graphical content to the portable media device; and
a transport channel generation system that is configured to:
receive the video content and the audio content of the program of interest; and broadcast the program of interest in the media content stream to the media device.

16. A method performed by a portable media device, comprising:

communicatively coupling the portable media device to a content access device via a network,
wherein the content access device is located at a customer premises,
wherein the portable media device is remote from the customer premises,
wherein a program of interest comprises video content, audio content, and a supplemental media rich content trigger, and
wherein the supplemental media rich content trigger includes access information configured to enable the portable media device to access supplemental media rich content at a media rich content server via the network;

receiving, at the portable media device, the program of interest with the supplemental media rich content trigger from the content access device via the network;

presenting the video content of the program of interest on a display of the portable media device,
wherein a currently presented portion of the video content presents an image of an object that is associated with the supplemental media rich content trigger;

establishing, at the portable media device, a communication link over the network between the portable media device and the media rich content server,
wherein the communication link is established based upon the access information in the received supplemental media rich content trigger;

receiving, via the network, the supplemental media rich content at the portable media device in response to the received supplemental media rich content trigger,
wherein the supplemental media rich content includes graphical content that is associated with the object;

concurrently presenting the received graphical content of the supplemental media rich content and the video content of the program of interest on the display of the portable media device,
wherein the graphical content of the supplemental media rich content is different from the video content of the program of interest, and
wherein the graphical content of the supplemental media rich content presents supplemental information pertaining to the object presented in the video content presented on the display of the portable media device;

ending presentation of the received graphical content of the supplemental media rich content after a predefined duration that begins when the received graphical content is initially presented on the display of the portable media device;

receiving a user selection corresponding to a request to end presentation of the received graphical content of the supplemental media rich content, wherein the user selection is received before the end of the predefined duration; and ending presentation of the received graphical content of the supplemental media rich content in response to receiving the user selection.

17. The method of claim 16, further comprising:
automatically ending, during the predefined duration, presentation of the graphical content of the supplemental media rich content in response to the object no longer being presented in the video content presented on the display of the portable media device.

18. The method of claim 17, wherein after presentation of the graphical content has ended, the method further comprising:
closing the communication link that was established between the portable media device and the media rich content server; and
continuing presentation of the program of interest on the display of the portable media device.

19. The method of claim 16, further comprising:
automatically ending presentation of the graphical content of the supplemental media rich content after the predefined duration that begins after the object is no longer being presented in the video content presented on the display of the portable media device.

20. The method of claim 19, wherein after presentation of the graphical content has ended, the method further comprising:
closing the communication link that was established between the portable media device and the media rich content server; and
continuing presentation of the program of interest on the display of the portable media device.

* * * * *